United States Patent [19]

Kelly et al.

[11] Patent Number: 4,468,149

[45] Date of Patent: Aug. 28, 1984

[54] ASSEMBLY FOR ANCHORING AN ELEMENT TO A SLAB

[75] Inventors: David L. Kelly, Sacramento; Frank E. Turner, San Mateo, both of Calif.

[73] Assignee: The Burke Company, San Mateo, Calif.

[21] Appl. No.: 467,097

[22] Filed: Feb. 16, 1983

[51] Int. Cl.³ .............................................. F16B 35/04
[52] U.S. Cl. ..................................... 403/316; 52/704; 411/400; 411/385
[58] Field of Search .................... 403/316, 317, 408; 52/704, 711, 150, 146, 126, 745; 411/400, 385

[56] References Cited

U.S. PATENT DOCUMENTS

| | | | |
|---|---|---|---|
| 2,446,030 | 7/1948 | Tunnard-Moore | 269/48.2 |
| 3,043,411 | 7/1962 | Wyrough | 403/361 |
| 3,204,514 | 9/1965 | Sauvet | 411/385 |
| 4,379,650 | 4/1983 | Frankenfield | 411/385 X |

FOREIGN PATENT DOCUMENTS 405203  2/1934  United Kingdom ................ 411/385

*Primary Examiner*—Andrew V. Kundrat
*Attorney, Agent, or Firm*—Limbach, Limbach & Sutton

[57] ABSTRACT

An assembly for anchoring an element to a concrete slab (10) through means of a bore (22) extending through the slab and a bolt (26) removably received within the bore (22). The bolt (26) has a laterally extending foot (28) engageable with one side of the slab (10). A tapered spike (30) having a length greater than the thickness of the slab (10) is extended through the bore (22) to force the foot (28) into underlying engagement with the slab (10) and maintain the bolt (26) in such engagement and secure the bolt (26) against rotation.

6 Claims, 8 Drawing Figures

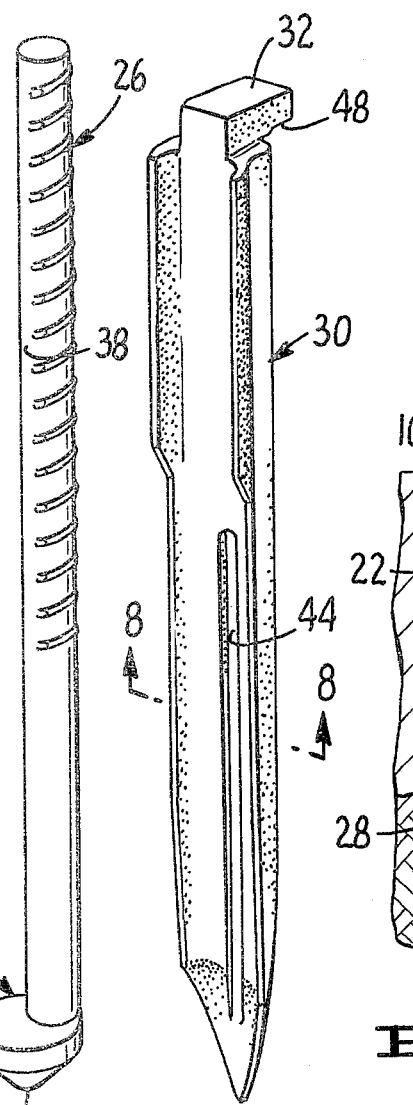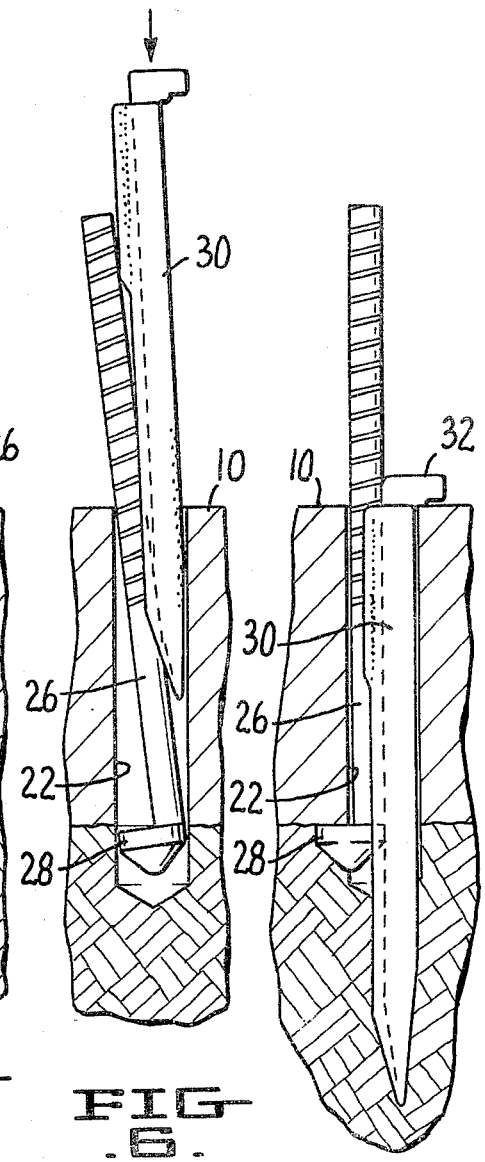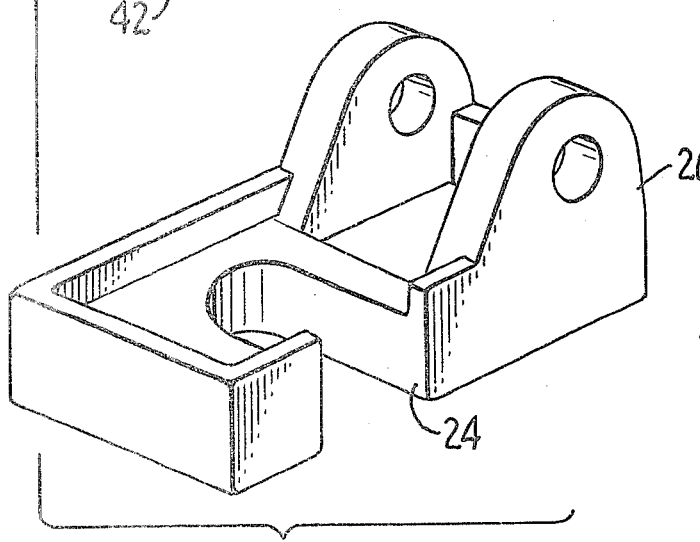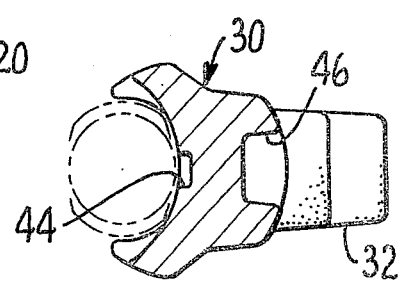

4,468,149

ASSEMBLY FOR ANCHORING AN ELEMENT TO A SLAB

RELATED APPLICATION

The invention of the present application is an improvement over that of commonly-owned copending application Ser. No. 183,724, filed Sept. 2, 1980, by David J. Frankenfield, for an IMPROVED ANCHORING MEANS FOR WALL BRACES and now U.S. Pat. No. 4,379,650.

BACKGROUND OF THE INVENTION

The present invention relates to an assembly for anchoring elements to concrete slabs and, more particularly, is concerned with such an assembly ideally suited for anchoring the braces used to temporarily support concrete slabs used in tilt-up construction. In its more specific aspects, the invention is directed to an assembly wherein removable anchoring elements are received within a bore formed in a concrete slab in such manner as to provide a secure attachment which may not be inadvertently loosened or displaced.

Prior anchoring assemblies which rely on elements received within bores formed in plates or slabs are well-known. The most significant is thought to be that of aforementioned commonly-owned copending application Ser. No. 183,724. Braces for tilt-up slabs and slab mounted anchors for such braces are also well-known, as may be seen from U.S. Pat. Nos. 3,300,943 and 4,011,638.

SUMMARY OF THE INVENTION

The anchor assembly of the present invention is an improvement over that of prior commonly-owned copending application Ser. No. 183,724 now U.S. Pat. No. 4,379,650 in the specifics of the construction of the bolt and spike elements. The improved bolt has a head of increased bearing area and strength and of a configuration to facilitate its placement and accommodate debris which may be in the bore within which the bolt is received. The spike is of a configuration which enhances its use as a wedge to force the bolt into place and also serves to laterally embrace the bolt within the bore and secure the bolt against rotation. The spike also incorporates an improved longitudinally grooved cross-section which minimizes friction between the spike and the bore and bolt. Additionally, it incorporates an improved head construction which facilitates withdrawal of the spike from the bore.

A principal object of the invention is to provide an improved anchoring assembly which incorporates a bolt which extends fully through a slab and has a foot portion held in underlying relation to the slab by a wedge spike which serves to both support the bolt and secure it against turning or inadvertent displacement.

Another object of the invention is to provide such an assembly wherein the spike is of a configuration which facilitates its wedging operation and minimizes the frictional forces involved.

Still another object of the invention is to provide such assembly wherein the spike and bolt are of a configuration which accommodates debris which may be present in the bore in which they are received.

Yet another object of the invention is to provide such an assembly wherein the bolt and spike are of a rugged construction and the spike lends lateral support to the bolt when the assembly is in place.

Yet another object of the invention is to provide such an assembly wherein the spike is provided with an improved construction to facilitate its removal.

The foregoing and other objects will become more apparent when viewed in light of the following description and accompanying drawings.

BRIEF DESCRIPTION OF THE DRAWINGS

FIG. 4 is an exploded perspective view illustrating the brace plate, bolt and spike used in the assembly.

FIGS. 5, 6 and 7 are cross-sectional elevational views showing the steps of first placing the bolt within a bore, then employing the spike to force the bolt to one side of the bore, and then employing the spike to maintain the bolt in place in underlying relationship to one side of the slab within which the bore is formed.

FIG. 8 is a transverse cross-sectional view taken on the plane designated by line 8—8 of FIG. 4.

DESCRIPTION OF THE PREFERRED EMBODIMENT

Figure 1:
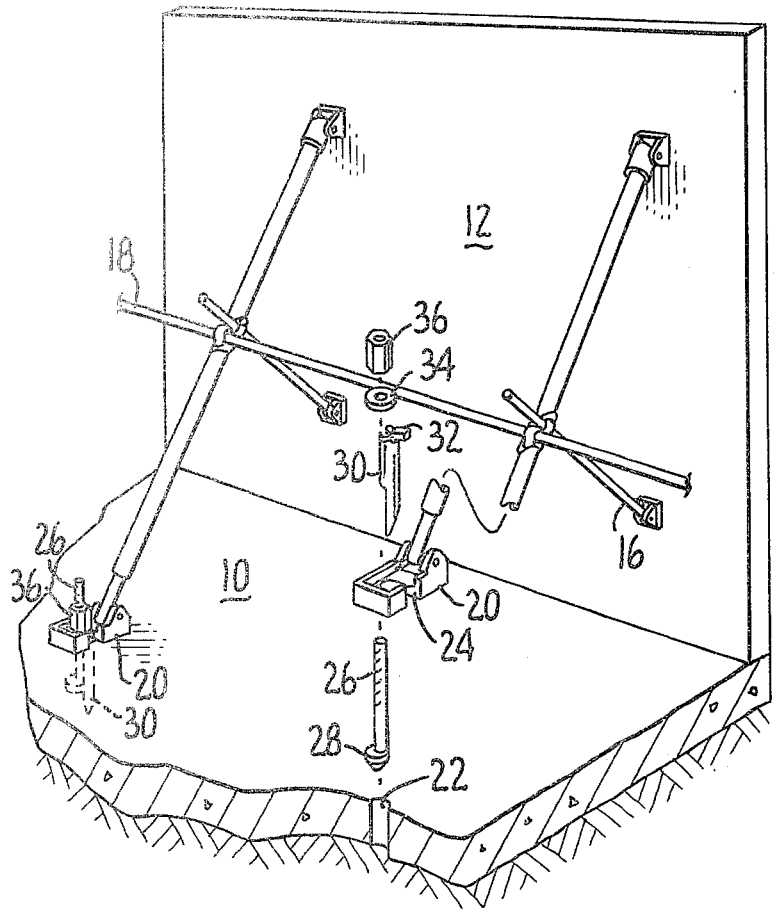
FIG. 1 is a perspective view of a tilt-up wall slab and bracing means therefor, including the anchor assembly of the present invention, with the elements of the assembly shown in exploded view.

Referring to FIG. 1, the invention is shown in an environment which includes a concrete floor slab 10 and a concrete wall slab 12, the latter having been poured in a horizontal position and then tilted into a vertical position after curing. During fabrication, the wall slab 12 is provided with anchors, in the form of screw sockets or the like, of the type shown in U.S. Pat. No. 3,590,536, to facilitate the tilt-up braces 14 and knee braces 16. Lace brace 18 forms the third of a three-component brace system which is illustrated and described in full detail in U.S. Pat. No. 4,011,638. The lower ends of the tilt-up braces 14 have shoe plate 20 pivotally connected thereto. The present invention is concerned with the anchor means forming a positive interconnection between the shoe plate 20 and the slab 10.

Figure 2:
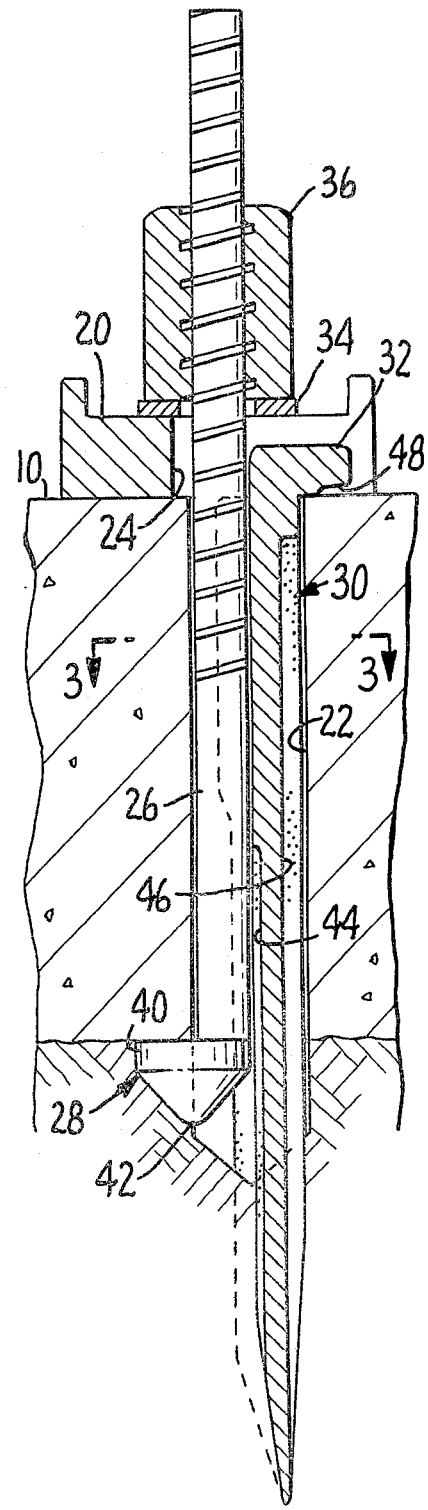
FIG. 2 is a cross-sectional elevational view of the assembly.

The anchor assembly of the invention comprises a cylindrical bore 22 which extends completely through the slab 10; an open-ended slot 24 formed in the shoe plate 20; an externally threaded anchor bolt 26 having a right-angled foot portion 28 adapted to extend radially beneath the slab 10, as shown in FIG. 2; a wedge spike 30 formed of cast ductile iron and having a right-angled upper head 32 adapted to overlie the slab 10 and reside within slot 24 of the plate 20; a washer 34 received around the upper portion of the bolt 26 above the plate 20; and an elongated nut 36 adapted to be threadably engaged with the bolt 26 and thereby place the slab 10 under compression between the plate 20 and the anchor bolt foot portion 28.

The anchor bolt 26 preferably is formed out of concrete reinforcing bar stock which is provided by hot rolling with a screw thread, the bolt having diametrically opposed flats 38. The foot portion 28 is hot forged on the end of the bolt 26 in eccentric relationship thereto. The upper segment of the foot portion, designated 40, is of a circular cross-section, as viewed in a plane normal to the longitudinal axis of the bolt, and of a diameter slightly less than that of the bore 22. As viewed in a plane parallel to the axis of the bolt 26, the segment 40 merges into a lower distal end 42 of converging conical configuration. During the forging process in which the foot portion 28 is formed, the shank of the bolt immediately above the portion is gripped within cylindrical grippers which serve to substantially remove the screw thread therefrom (see FIG. 4). Thus, the bolt has a generally unthreaded portion immediately above and adjacent the foot portion 28 and a threaded portion over its upper length.

The spike 30 is of approximately the same length as the bolt 26. Thus, when the bolt and spike are in place with the head of the spike coincident with a shoe plate and the bolt extending upwardly from the shoe plate (see FIG. 2), the lower end of the spike extends beyond the lower end of the bolt. As a result, the full length of the bolt received within the bore 22 is engaged and laterally constrained by the spike.

Figure 3:
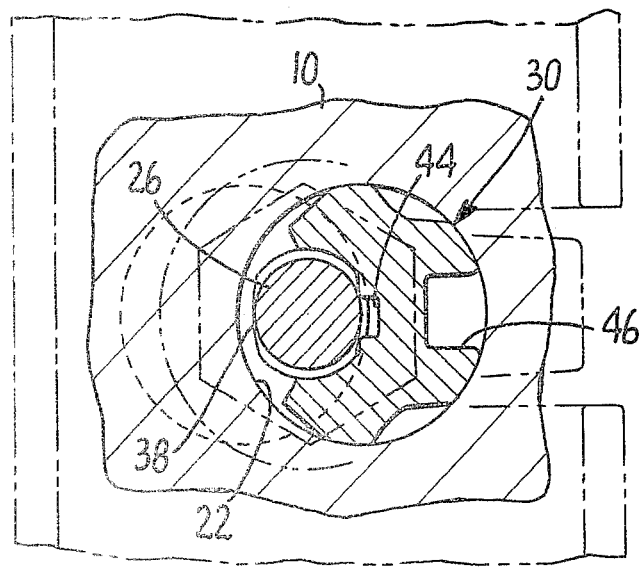
FIG. 3 is a transverse cross-sectional view taken on the plane designated by line 3—3 of FIG. 2.

As can be seen from FIGS. 4 and 8, the spike 20 is a generally semicircular cross-section, with a concave inner surface complemental to the bolt 26 and the upper segment 40 of the foot portion 28, and an outer surface complemental to the bore 22. The inner surface of the spike is proportioned to extend around approximately one-half of the circumference of the bolt 26. The outer surface of the spike is proportioned to extend around and engage in excess of one-half of the inner circumference of the bore 22 (see FIG. 3). The degree to which the outer surface of the spike engages the inner circumference of the bore 20 varies over the length of the spike, since the upper segment of the spike has wings which extend around the bore to a greater degree than does the lower portion of the spike.

The spike is also formed with longitudinally extending inner and outer grooves 44 and 46, respectively. These grooves reduce the friction between the spike and the surfaces of the bore and the bolt. They also accommodate debris which may be present in the bore. The undersurface of the head 32 is formed with a recess 48 which opens through the outside edge of the head. This recess provides a space between the head and the top of the slab 30 into which a tool, such as a screwdriver, may be inserted to assist in removing the spike from the bore 22.

The lower end of the spike 30 is tapered on its inner and outer surfaces to facilitate the spike for use as a wedge to force the bolt 26 laterally to one side of the bore 22 so as to position the head portion 28 in underlying relation to the slab.

To install the anchor assembly, the bolt 26 is first passed fully through the bore 22, as may be seen from FIG. 5. The spike 30 is then driven into the bore, as seen in FIG. 6, to force the foot portion 28 into underlying relation to the slab. Once the spike is driven fully into place and the head 32 rests against the top of the slab, the spike serves to secure the bolt in place and against rotation (see FIG. 7). The shoe plate 20 is then placed over the bolt, with the opening provided by the slot 24 in registry with the bore 22 and the head 32 extending within one side of the slot 24. The washer 34 and nut 36 are then placed upon the end of the bolt extending upwardly from the shoe plate 20. The nut is then tightened, thereby securing the shoe plate in place and locking the spike 30 beneath the washer.

It should be appreciated that the bore 22 is formed through a drilling process which creates some debris which may accumulate beneath the slab 10. If the slab is positioned on an earthen supporting surface, the drilling process is ideally carried out in such a way as to form a recess in this surface (see FIG. 5). That recess accommodates both any drilling debris and, ultimately, the head portion of the bolt. The conical distal end of the bolt also functions to accommodate such debris and to facilitate movement of the foot portion 28 beneath the slab.

The slots 44 and 46 and the recessed sides of the spike 30 also accommodate such debris and serve to lighten the spike and reduce the amount of material required for its manufacture. It should also be appreciated that the groove 44 may accommodate any flashing on the side of the bolt which faces the spike 30. Such flashing may occur as the result of the roll-forming process used to form the threads on the bolt.

Conclusion

While a preferred embodiment of the invention and its mode of operation have been illustrated and described, it should be understood that the invention is not intended to be limited to the specifics of that embodiment, but rather is defined by the accompanying claims.

What is claimed is:

1. An improved assembly for anchoring an element to a slab, said assembly comprising: a cylindrical bore formed in the slab; a footplate disposed to one side of the slab and having an aperture in registry with said bore; a threaded anchor bolt removably extending through said aperture and fully through said bore, said bolt having a foot portion of generally circular cross-section, as viewed in a plane normal to the bolt, disposed eccentrically relative to the bolt so as to extend laterally therefrom into underlying relation to the slab, said cross-section being a diameter slightly less than that of the bore to enable emplacement and removal of said bolt through said bore; an anchor bolt wedge spike extending fully through said bore maintain the foot portion in underlying relation to the slab, said spike having an inner surface complementally engaged with the foot portion and bolt, which surface has a longitudinally extending groove to reduce friction between the bolt and spike, and an outer surface complementally engaged with the bore whereby the spike laterally supports the bolt within the bore and prevents the foot portion from rotating relative to the spike; a right-angled head portion formed on the spike and engaged with the side of the slab opposite that engaged by the foot portion of the bolt, said head portion being disposed within the aperture of the plate; and, a nut bearing against the footplate in removably threaded engagement with the bolt to secure the plate to the bolt.

2. In a slab anchoring assembly comprising a cylindrical bore formed through a slab and a removable bolt received within and extending fully through said bore, said bolt having a foot fixed thereto and extending laterally therefrom for movement into underlying relation to the slab upon forcing of the bolt laterally against one side of the bore, an improved spike for forcing the bolt to said one side and maintaining the foot in underlying relation to the slab, said spike comprising: a body extending through the bore and having a length greater than that of the bore, a tapered surface converging toward the distal end of the body to enable the spike to be driven into the bore and serve as a wedge to force the foot into underlying relation to the slab; a concave inner surface complementally engaged with the bolt and the foot, and an outer surface complementally engaged with the bore, whereby the spike laterally supports the bolt within the bore and prevents the foot from rotating relative to the spike; and, a right-angled head portion formed on the spike and engaged with the side of the slab opposite that engaged by the foot portion, said head portion having a recess formed in the lower surface thereof and opening through an edge thereof to accommodate insertion of a lifting tool between the head and slab.

3. An improved assembly for anchoring an element to a slab, said assembly comprising: a cylindrical bore formed in the slab; a footplate disposed to one side of the slab and having an aperture in registry with said bore; a threaded anchor bolt removably extending through said aperture and fully through said bore, said bolt having a foot portion of generally circular cross-section, as viewed in a plane normal to the bolt, disposed eccentrically relative to the bolt so as to extend laterally therefrom into underlying relation to the slab, said cross-section being of a diameter slightly less than that of the bore to enable emplacement and removal of said bolt through said bore; an anchor bolt wedge spike extending fully through said bore maintain the foot portion in underlying relation to the slab, said spike having an inner surface complementally engaged with the foot portion and bolt and an outer surface complementally engaged with the bore whereby the spike laterally supports the bolt within the bore and prevents the foot portion from rotating relative to the spike, said outer surface having a longitudinally extending groove to reduce friction between the bore and spike; a right-angled head portion formed on the spike and engaged with the side of the slab opposite that engaged by the foot portion of the bolt, said head portion being disposed within the aperture of the plate; and, a nut bearing against the footplate in removably threaded engagement with the bolt to secure the plate to the bolt.

4. An improved assembly for anchoring an element to a slab, said assembly comprising: a cylindrical bore formed in the slab; a footplate disposed to one side of the slab and having an aperture in registry with said bore; a threaded anchor bolt removably extending through said aperture and fully through said bore, said bolt having a foot portion of generally circular cross-section, as viewed in a plane normal to the bolt, disposed eccentrically relative to the bolt so as to extend laterally therefrom into underlying relation to the slab, said cross-section being of a diameter slightly less than that of the bore to enable emplacement and removal of said bolt through said bore; an anchor bolt wedge spike extending fully through said bore maintain the foot portion in underlying relation to the slab, said spike having an inner surface complementally engaged with the foot portion and bolt and an outer surface complementally engaged with the bore whereby the spike laterally supports the bolt within the bore and prevents the foot portion from rotating relative to the spike; a right-angled head portion formed on the spike and engaged with the side of the slab opposite that engaged by the foot portion of the bolt, said head portion being disposed within the aperture of the plate, and having a recess formed in the lower surface thereof and opening through an edge thereof to accommodate insertion of a lifting tool between the head and the slab.

5. In a slab anchoring assembly comprising a cylindrical bore formed through a slab and a removable bolt received within and extending fully through said bore, said bolt having a foot fixed thereto and extending laterally therefrom for movement into underlying relation to the slab upon forcing of the bolt laterally against one side of the bore, an improved spike for forcing the bolt to said one side and maintaining the foot in underlying relation to the slab, said spike comprising: a body extending through the bore and having a length greater than that of the bore, a tapered surface converging toward the distal end of the body to enable the spike to be driven into the bore and serve as a wedge to force the foot into underlying relation to the slab; a concave inner surface complementally engaged with the bolt and the foot, which surface has a longitudinally extending groove to reduce friction between the bolt and spike, and an outer surface complementally engaged with the bore, whereby the spike laterally supports the bolt within the bore and prevents the foot from rotating relative to the spike; and, a right-angled head portion formed on the spike and engaged with the side of the slab opposite that engaged by the foot portion.

6. In a slab anchoring assembly comprising a cylindrical bore formed through a slab and a removable bolt received within and extending fully through said bore, said bolt having a foot fixed thereto and extending laterally therefrom for movement into underlying relation to the slab upon forcing of the bolt laterally against one side of the bore, an improved spike for forcing the bolt to said one side and maintaining the foot in underlying relation to the slab, said spike comprising: a body extending through the bore and having a length greater than that of the bore, a tapered surface converging toward the distal end of the body to enable the spike to be driven into the bore and serve as a wedge to force the foot into underlying relation to the slab; a concave inner surface complementally engaged with the bolt and the foot, and an outer surface complementally engaged with the bore, whereby the spike laterally supports the bolt within the bore and prevents the foot from rotating relative to the spike, said outer surface having a longitudinally extending groove to reduce friction between the bore and spike, and, a right-angled head portion formed on the spike and engaged with the side of the slab opposite that engaged by the foot portion.

* * * * *